United States Patent [19]

Kloos

[11] Patent Number: 5,675,927
[45] Date of Patent: Oct. 14, 1997

[54] SHOCK RESISTANT ILLUMINATED FISHING BOBBER

[76] Inventor: Dan Kloos, 4655 County Rd. 140, Chaska, Minn. 55318

[21] Appl. No.: 664,554

[22] Filed: Jun. 17, 1996

[51] Int. Cl.$^6$ .................................................. A01K 93/00
[52] U.S. Cl. ...................................... 43/17.5; 43/44.9
[58] Field of Search .............................. 43/17.5, 17.6, 43/44.9, 44.91

[56] References Cited

U.S. PATENT DOCUMENTS

| | | | |
|---|---|---|---|
| 3,918,190 | 11/1975 | Hornbeck | 43/17.6 |
| 4,638,584 | 1/1987 | Lindsay | 43/17.6 |
| 4,741,120 | 5/1988 | Cota et al. | 43/17.5 |
| 4,817,326 | 4/1989 | Benjestorf | 43/44.9 |
| 4,972,623 | 11/1990 | Delricco | 43/17.6 |
| 5,279,066 | 1/1994 | Camera | 43/44.9 |

*Primary Examiner*—Jeanne M. Elpel

[57] ABSTRACT

A new Shock Resistant Illuminated Fishing Bobber for providing an illuminated slip bobber for utilization at night time which is shock resistant, providing a useful life of approximately five to ten years. The inventive device includes a transparent resilient container, an illuminating means positioned within the transparent resilient container, and an anti-shock material positioned within the transparent resilient container surrounding the illuminating means.

5 Claims, 3 Drawing Sheets

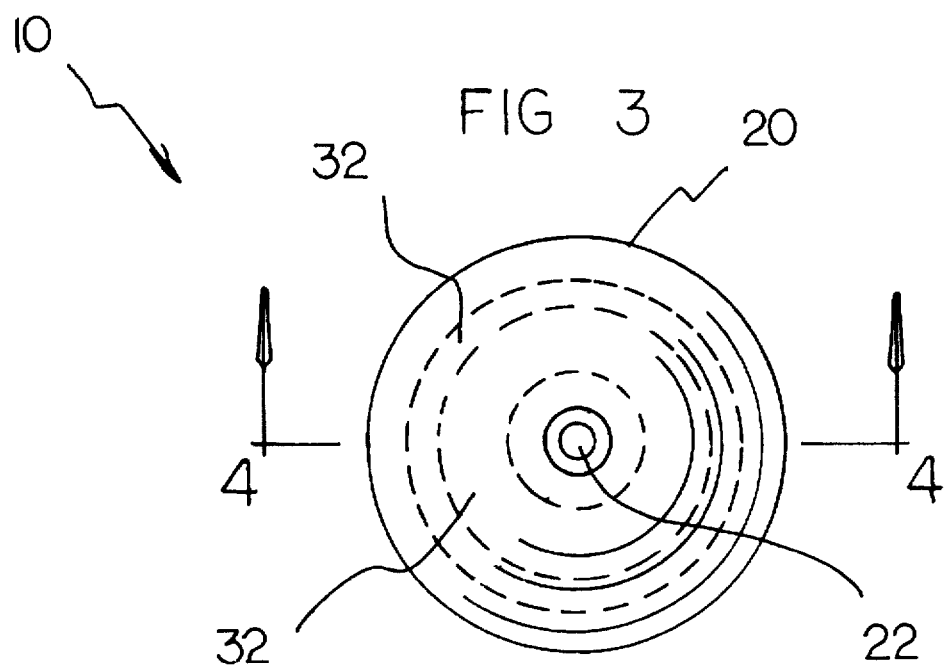
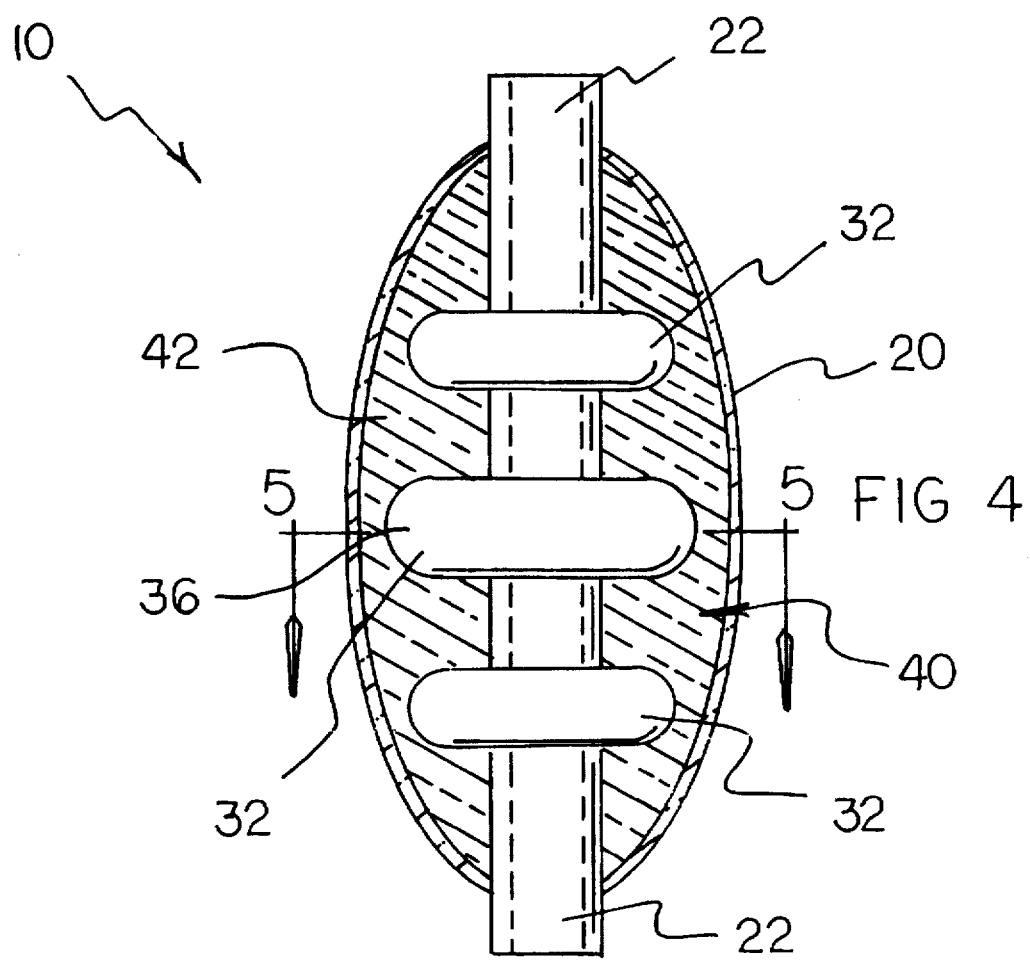

SHOCK RESISTANT ILLUMINATED FISHING BOBBER

BACKGROUND OF THE INVENTION

1. Field of the Invention

The present invention relates to Illuminating Devices and more particularly pertains to a new Shock Resistant Illuminated Fishing Bobber for providing an illuminated slip bobber for utilization at night time which is shock resistant, providing a useful life of approximately five to ten years.

2. Description of the Prior Art

The use of Illuminating Devices is known in the prior art. More specifically, Illuminating Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Illuminating Devices include U.S. Pat. No. 5,199,205; U.S. Pat. No. 4,827,655; U.S. Design Pat. No. 334,792; U.S. Pat. No. 4,916,846; U.S. Pat. No. 4,922,643 and U.S. Pat. No. 4,010,567.

While these devices fulfill their respective, particular objectives and requirements, the aforementioned patents do not disclose a new Shock Resistant Illuminated Fishing Bobber. The inventive device includes a transparent resilient container, an illuminating means positioned within the transparent resilient container, and an anti-shock material positioned within the transparent resilient container surrounding the illuminating means.

In these respects, the Shock Resistant Illuminated Fishing Bobber according to the present invention substantially departs from the conventional concepts and designs of the prior art, and in so doing provides an apparatus primarily developed for the purpose of providing an illuminated slip bobber for utilization at night time which is shock resistant, providing a useful life of approximately five to ten years.

SUMMARY OF THE INVENTION

In view of the foregoing disadvantages inherent in the known types of Illuminating Devices now present in the prior art, the present invention provides a new Shock Resistant Illuminated Fishing Bobber construction wherein the same can be utilized for providing an illuminated slip bobber for utilization at night time which is shock resistant, providing a useful life of approximately five to ten years.

The general purpose of the present invention, which will be described subsequently in greater detail, is to provide a new Shock Resistant Illuminated Fishing Bobber apparatus and method which has many of the advantages of the Illuminating Devices mentioned heretofore and many novel features that result in a new Shock Resistant Illuminated Fishing Bobber which is not anticipated, rendered obvious, suggested, or even implied by any of the prior art Illuminating Devices, either alone or in any combination thereof.

To attain this, the present invention generally comprises a transparent resilient container, an illuminating means positioned within the transparent resilient container, and an anti-shock material positioned within the transparent resilient container surrounding the illuminating means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Shock Resistant Illuminated Fishing Bobber apparatus and method which has many of the advantages of the Illuminating Devices mentioned heretofore and many novel features that result in a new Shock Resistant Illuminated Fishing Bobber which is not anticipated, rendered obvious, suggested, or even implied by any of the prior art Illuminating Devices, either alone or in any combination thereof.

It is another object of the present invention to provide a new Shock Resistant Illuminated Fishing Bobber which may be easily and efficiently manufactured and marketed.

It is a further object of the present invention to provide a new Shock Resistant Illuminated Fishing Bobber which is of a durable and reliable construction.

An even further object of the present invention is to provide a new Shock Resistant Illuminated Fishing Bobber which is susceptible of a low cost of manufacture with regard to both materials and labor, and which accordingly is then susceptible of low prices of sale to the consuming public, thereby making such Shock Resistant Illuminated Fishing Bobber economically available to the buying public.

Still yet another object of the present invention is to provide a new Shock Resistant Illuminated Fishing Bobber which provides in the apparatuses and methods of the prior art some of the advantages thereof, while simultaneously overcoming some of the disadvantages normally associated therewith.

Still another object of the present invention is to provide a new Shock Resistant Illuminated Fishing Bobber for providing an illuminated slip bobber for utilization at night time which is shock resistant, providing a useful life of approximately five to ten years.

Yet another object of the present invention is to provide a new Shock Resistant Illuminated Fishing Bobber which includes a transparent resilient container, an illuminating means positioned within the transparent resilient container, and an anti-shock material positioned within the transparent resilient container surrounding the illuminating means.

Still yet another object of the present invention is to provide a new Shock Resistant Illuminated Fishing Bobber that is resistant to shock from the bobber striking against the side of a boat or side of an ice hole.

Even still another object of the present invention is to provide a new Shock Resistant Illuminated Fishing Bobber that illuminates providing accurate detection of a bite during night time fishing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top view of the present invention.

FIG. 4 is a cross sectional view taken along line 4—4 of FIG. 3 disclosing the plurality of clear tubular rings surrounded by the anti-shock material.

DESCRIPTION OF THE PREFERRED EMBODIMENT

Figure 1:
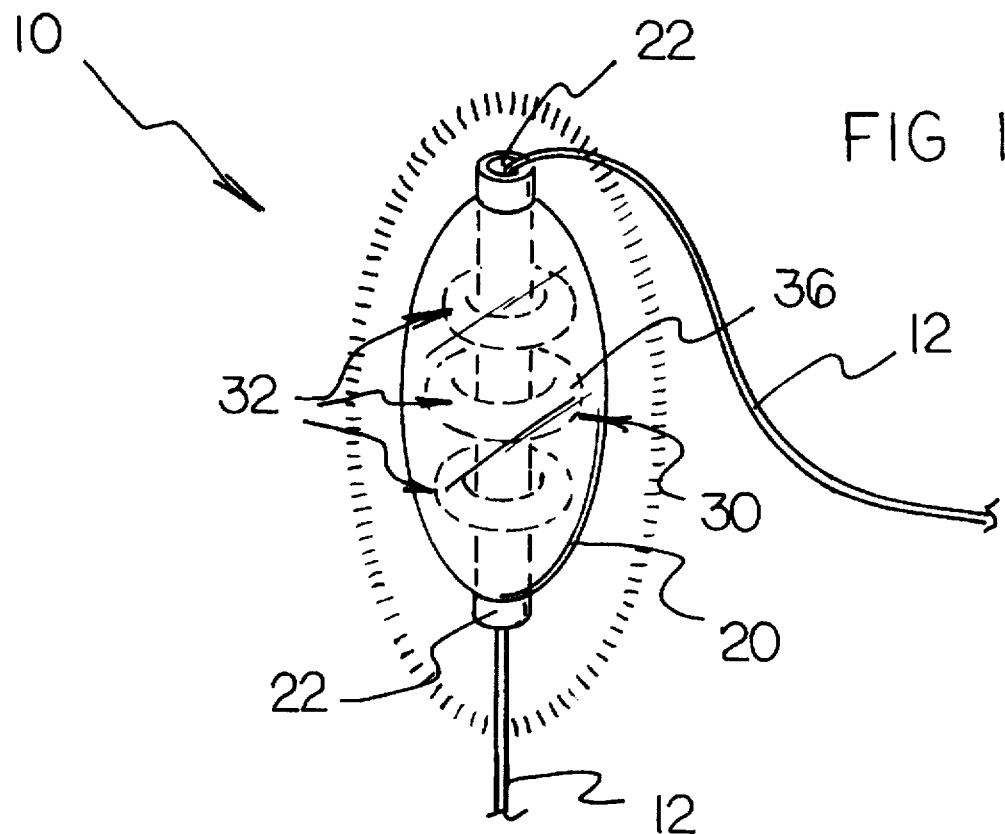
FIG. 1 is a upper side perspective view of a new Shock Resistant Illuminated Fishing Bobber with a fishing line projecting through the tube according to the present invention.
Figure 2:
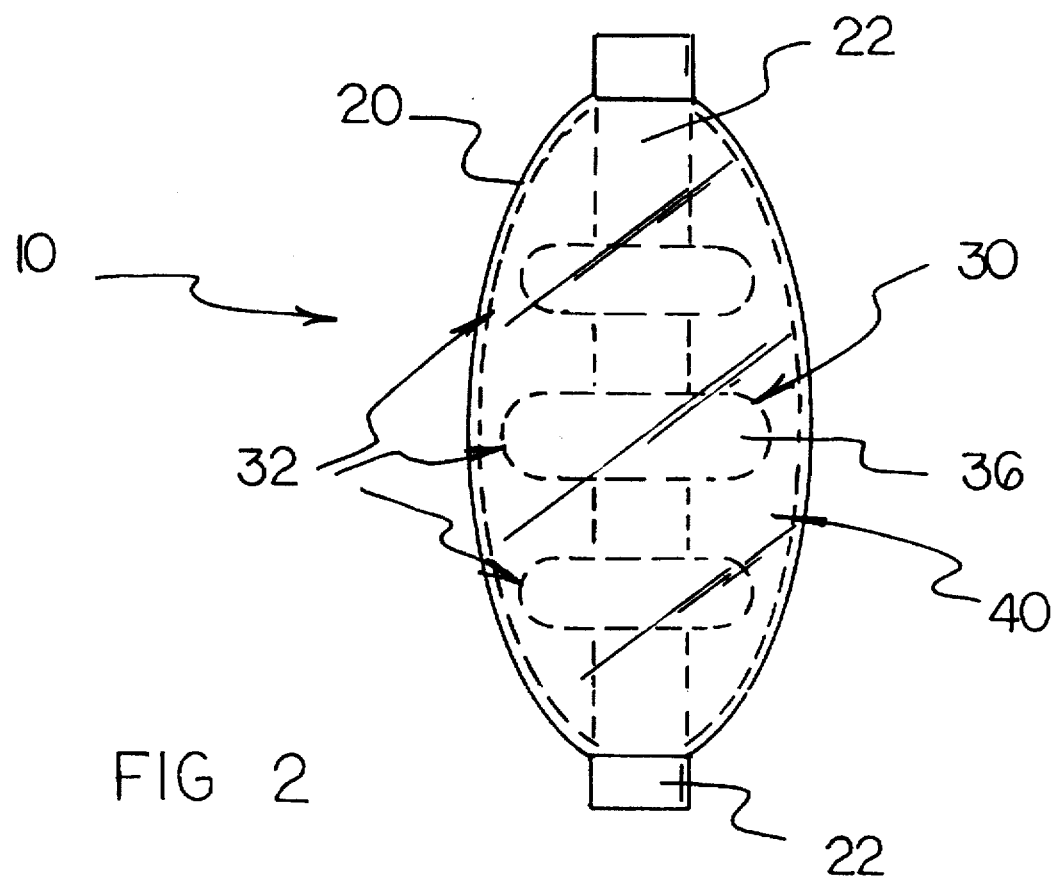
FIG. 2 is a side view of the present invention disclosing the plurality of clear tubular rings surrounding the tube of the transparent resilient container.
Figure 5:
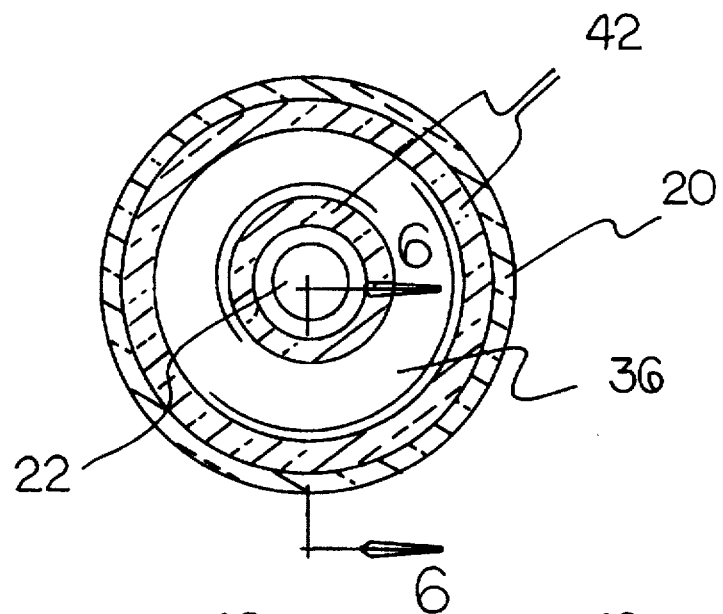
FIG. 5 is a cross sectional view taken along line 5—5 of FIG. 4 disclosing the center clear tubular ring in relation to the transparent resilient container.
Figure 6:
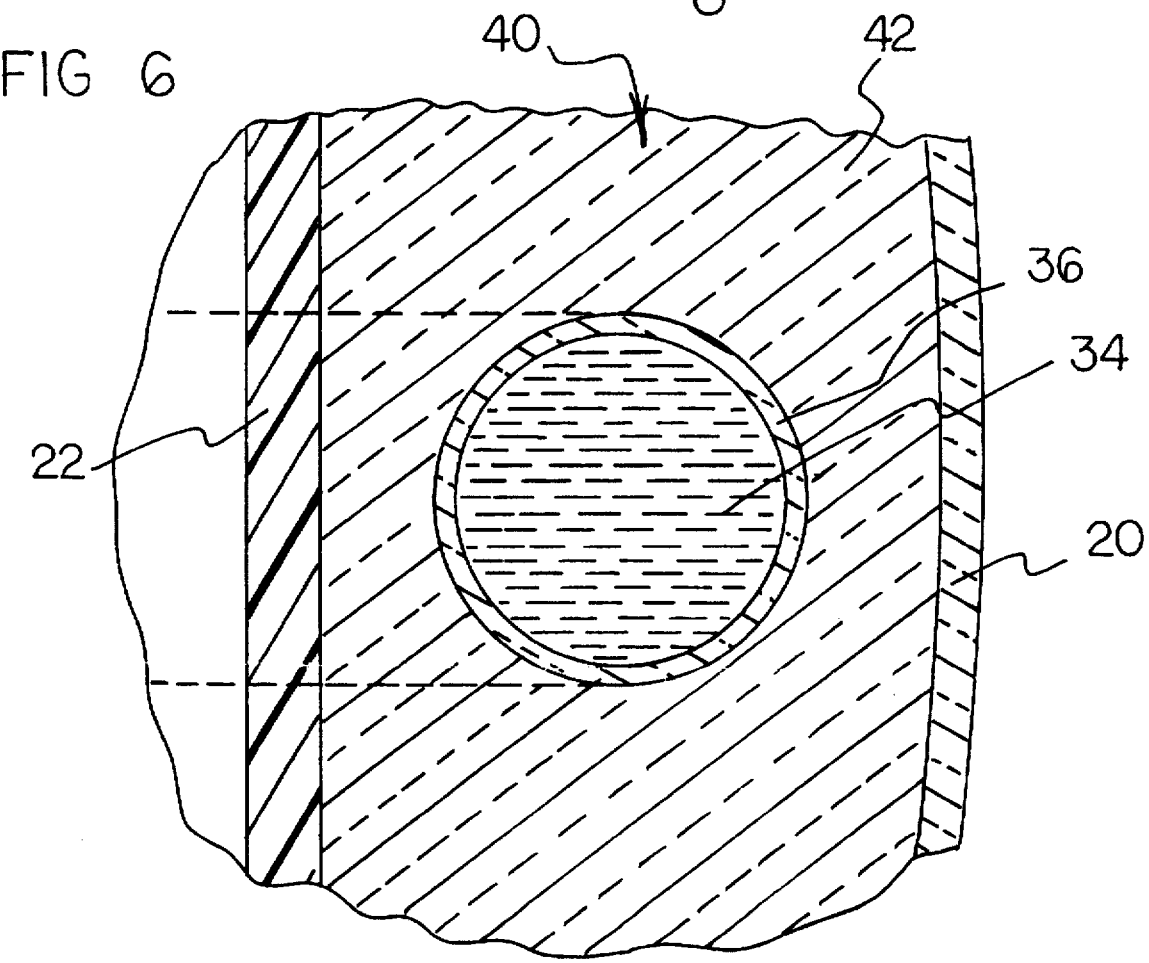
FIG. 6 is a cross sectional view taken along line 6—6 of FIG. 5 displaying the clear tubular ring with the illuminating material within the clear tubular ring and further the anti-shock material surrounding the clear tubular ring.

With reference now to the drawings, and in particular to FIGS. 1 through 6 thereof, a new Shock Resistant Illuminated Fishing Bobber embodying the principles and concepts of the present invention and generally designated by the reference numeral 10 will be described.

More specifically, it will be noted that the Shock Resistant Illuminated Fishing Bobber 10 comprises a transparent resilient container 20 which is buoyant, an illuminating means 30 positioned within the transparent resilient container 20, and an anti-shock material 40 positioned within the transparent resilient container 20 and further surrounding the illuminating means 30 protecting the illuminating means from damage.

As best illustrated in FIGS. 1 through 6, it can be shown that the transparent resilient container 20 includes a tube 22 projecting through the central longitudinal axis receiving a fishing line 12. The illuminating means 30 includes a plurality of clear tubular rings 32 surrounding the tube 22 of the transparent resilient container 20. The clear tubular rings 32 contain an illuminating material 34 which emanates light during darkness. The anti-shock material 40 comprises transparent silicone 42, as best shown in FIG. 4 of the drawings, which protects the clear tubular rings 32 from damage during utilization of the present invention. The illuminating material 34 preferably comprises a phosphorous and tritium mixture. The transparent resilient container 20 is substantially oval shaped so as to provide optimum response to bites from a fish as best shown in FIG. 1 of the drawings. There are preferably three clear tubular rings 32 within the transparent resilient container 20 as best shown in FIG. 4 of the drawings. The central tubular ring 36 is preferably substantially larger in diameter than the two opposing tubular rings 32 as shown in FIG. 4 of the drawings.

In use, the user projects the fishing line 12 through the tube 22 of the transparent resilient container 20. The user then positions the present invention into the unlabeled water where the illuminating means 30 emanates light which the user is able to observe during darkness. The illuminating means has a useful life of approximately five to ten years.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A Shock Resistant Illuminated Fishing Bobber comprising:

a transparent resilient container;

an illuminating means positioned within the transparent resilient container;

an anti-shock material positioned within the transparent resilient container and further surrounding the illuminating means; and the illuminating means includes a plurality of clear tubular rings, wherein the clear tubular rings contain an illuminating material.

2. A Shock Resistant Illuminated Fishing Bobber comprising:

a transparent resilient container;

an illuminating means positioned within the transparent resilient container;

an anti-shock material positioned within the transparent resilient container and further surrounding the illuminating means;

the transparent resilient container includes a tube projecting through the central longitudinal axis for receiving a fishing line; and the illuminating means includes a plurality of clear tubular rings surrounding the tube of the transparent resilient container, where the clear tubular rings contain an illuminating material.

3. The Shock Resistant Illuminated Fishing Bobber of claim 2, wherein the anti-shock material comprises transparent silicone.

4. The Shock Resistant Illuminated Fishing Bobber of claim 3, wherein the illuminating material comprises a phosphorous and tritium mixture.

5. The Shock Resistant Illuminated Fishing Bobber of claim 4, wherein the transparent resilient container is substantially oval shaped, and wherein there are three clear tubular rings within the transparent resilient container where the central tubular ring is substantially larger in diameter than the two opposing tubular rings.

* * * * *